US007457620B2

(12) United States Patent
Lam et al.

(10) Patent No.: US 7,457,620 B2
(45) Date of Patent: Nov. 25, 2008

(54) OFF-CHANNEL BEACONS IN A WIRELESS NETWORK

(75) Inventors: Alex C. K. Lam, San Jose, CA (US); Brian Hart, Milpitas, CA (US); Mark Krischer, Lane Cove (AU); David Sheldon Stephenson, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 387 days.

(21) Appl. No.: 11/182,206

(22) Filed: Jul. 15, 2005

(65) Prior Publication Data

US 2007/0014267 A1     Jan. 18, 2007

(51) Int. Cl.
*H04Q 7/00*     (2006.01)
(52) U.S. Cl. .................... 455/434; 370/328; 370/331
(58) Field of Classification Search .............. None
See application file for complete search history.

(56) References Cited

U.S. PATENT DOCUMENTS 6,665,269 B1 * 12/2003 Schmitz ................ 370/251

| | | | |
|---|---|---|---|
| 2005/0064818 A1 | 3/2005 | Assarsson et al. | 455/41.2 |
| 2005/0136845 A1* | 6/2005 | Masuoka et al. | 455/67.14 |
| 2006/0007874 A1 | 1/2006 | Kekki | 370/312 |
| 2006/0034205 A1 | 2/2006 | Kim | 370/312 |
| 2006/0056367 A1* | 3/2006 | Marinier et al. | 370/338 |
| 2006/0165073 A1* | 7/2006 | Gopinath et al. | 370/389 |

* cited by examiner

*Primary Examiner*—Lester Kincaid
*Assistant Examiner*—Joel Ajayi
(74) *Attorney, Agent, or Firm*—Dov Rosenfeld; Inventek

(57) ABSTRACT

A method, apparatus, and software containing computer readable code to implement the method implemented in a first wireless device. The method includes, for a particular network identifier active in a wireless network, transmitting frames configured to advertise the infrastructure network of the particular network identifier. The transmitting of off-channel beacons is in a provided channel different than the channel in which the access point of the infrastructure wireless of the particular network identifier transmits beacon frames. The transmitting of off-channel beacons further is at a rate higher than the beacon rate frame at which the access point of the infrastructure wireless of the particular network identifier transmits beacon frames.

22 Claims, 10 Drawing Sheets

| Beacon frame body (lengths in octets) | | |
|---|---|---|
| Field | Length | Note |
| Timestamp | 8 | Time information of the transmitting AP, not the BSS being advertised. |
| Beacon Interval | 2 | Periodicity of beacon of the transmitting AP, not the BSS being advertised. |
| Capability | 2 | Per the BSS being advertised. |
| SSID | 2-34 | Per the BSS being advertised |
| Supported Rate | 3 | Supported rate of the transmitting AP, not the BSS being advertised, hence 1Mbps only. |
| Channel Redirection | 7+n, where n is number of channels | channels where the IE advertised BSS can be found. |
| <Other IEs> | ?? | per the BSS being advertised. |

FIG. 5

| Channel Redirection IE (lengths in octets) | | |
|---|---|---|
| Information | Length | Notes |
| ElementID | 1 | The vendor element value (224) |
| Length | 1 | The value 4+1+n |
| OUI/Type | 4 | 3-octets vendor OUI and 1-octet type value chosen by vendor |
| Channel Count | 1 | Number of channels to follow |
| Channel List | n | List of channel numbers where the client can find the advertised BSS. |

| BSS Information IE (lengths in octets) | | |
|---|---|---|
| Information | Length | Notes |
| ElementID | 1 | The vendor element value (224) |
| Length | 1 | Length of the BSS Information IE from OUI/Type field |
| OUI/Type | 4 | 3 octcts vendor OUI and 1 octet type value chosen by vendor |
| SSID | 2-34 | SSID of the BSS being advertised |
| Channel Count | 1 | Number of channels to follow |
| Channel List | n | List of channel numbers where the client can find the advertised BSS. |
| <Other IEs> | ?? | per the BSS being advertised. |

| Mini-Beacon frame fields | | | |
|---|---|---|---|
| Order | Order in full beacon | Information | Notes |
| 1 | 1 | Timestamp | As per in the main beacon |
| 2 | 2 | Beacon interval | This is the interval of the mini-beacon |
| 3 | 3 | Capability information | |
| 4 | 4 | SSID | This information element (IE) is length 1 and contain a single null character |
| 5 | 5 | Supported rates | This IE is length 1 and contains the byte 0x81. This requires a basic rate of 0.5Mbps which no client would support. In an alternate embodiment, another value that no client would support is used. |
| 6 | 7 | DS Parameter Set | If a DSSS PHY is used, this IE contains the current channel the mini-beacon is being transmitted on. |
| 7 | 10 | TIM | This is the same TIM as in the parent Beacon frame. This would allow mini-beacon aware clients to check for power save traffic on each mini-beacon rather than waiting for the parent beacon. |
| 8 | n/a | Mini-Beacon additional IE | This is an additional IE for mini-beacons. Includes information on the channel for off-channel-beacons. |

FIG. 8

| Mini-Beacon additional IE |||
|---|---|---|
| Information | Length | Notes |
| Element ID | 1 | The vendor element value (224) |
| Length | 1 | The value 5 |
| OUI/Type | 4 | The value 0X004096XX (XX chosen by vendor) |
| Beacon Count | 1 | Count until next parent beacon |
| Off Channel | 1 | Channel number for off channel beacons |

OFF-CHANNEL BEACONS IN A WIRELESS NETWORK

BACKGROUND

The present invention is related to wireless networks, and in particular to a method and apparatus for transmitting special beacons in a dedicated channel from a wireless station to direct clients to where full beacons are being sent by an access point of a wireless local area network (WLAN). By having a dedicated channel for such beacons, such special beacons may be sent more frequently than ordinary full beacons.

The present invention will be described in terms of the IEEE 802.11 standard, although the invention is not restricted to such wireless networks. In IEEE 802.11 compatible wireless networks, beacon frames are sent out periodically by an access point (AP). Probe responses are sent out in response to probe requests. Beacon frames and probe responses convey information to the associated and associating clients and to other APs as to the properties of the access point transmitting the beacons. They thus provide a mechanism to detect wireless networks.

By passive scanning is meant listening for beacons and probe responses without first transmitting a probe request. Thus, for an AP, passive scanning is the listening for and usually also recording of information from beacons and probe responses from other APs that are transmitting such beacons and probe responses. For a client, passive scanning is the listening for and usually also recording of information from beacons and probe responses from APs other than the client's AP that are transmitting such beacons and probe responses.

By active scanning is meant transmitting a probe request prior to listening for beacons and probe responses. Both active and passive scanning can occur on the same channel used for wireless communication (the "serving" channel) or other channels ("non-serving" channels). For non-serving channels typically an active scan is used. In full active scanning, the serving channel is vacated to probe all channels. Most wireless network interface devices support a mode usually called monitor mode wherein traffic on all channels is recorded, and this can be used for full active scanning.

Both active and passive scanning, for example, can be used to detect wireless networks. One application, for example, is determining another available network to roam to. Another is detecting potentially rogue access points. See for example, U.S. patent application Ser. No. 10/766,174 file Jan. 28, 2004 to inventors Olson, et al., titled A METHOD, APPARATUS, AND SOFTWARE PRODUCT FOR DETECTING ROGUE ACCESS POINTS IN A WIRELESS NETWORK, assigned to the assignee of the present invention, and incorporated herein by reference.

In the future it is likely that active scanning will not be permitted in certain regulatory domains, hindering the ability of devices to detect wireless networks. More specifically, due to radar detection requirements, devices may not be able to transmit on a given channel until they listen to the medium for a fixed period.

Thus, it may be that only passive scanning will be available to detect other wireless networks. Such passive scanning includes the device listening on each channel, e.g., for beacon frames. Thus, at worst, a device would need to listen for the maximum beacon period. For a battery-operated mobile device seeking to roam, this negatively impacts both roaming speed and battery life.

As an example of an application in which both battery life and roaming speed is important, mobile phone devices are being designed that can operate both on cellular wireless telephony networks, such as GSM, and in a WLAN, e.g., an IEEE 802.11 compatible WLAN. Such devices may be continuously searching for IEEE 802.11 WLANS in order to switch over from the more costly cellular, e.g., GSM network. Battery life, of course, is critical to such devices.

One proposed solution to this is to simply send beacons more frequently, thereby reducing the time a device needs to listen on a given channel. However, beacon frames can be quite large. Furthermore, many new wireless devices are being designed to operate as multiple "virtual" APs, transmitting beacons for multiple infrastructure wireless networks and corresponding network identifiers. The beacons from such devices are even larger than from a single AP device because of the need to send a list of the network identifiers (SSIDs) supported by the AP. Such beacon frames can consume bandwidth that could otherwise productively be used for data. This is exacerbated by the fact that beacon frames are transmitted at the lowest data rate for the basis service set (BSS). Furthermore, each BSSID's beacons need to be sent.

Thus, sending beacons more frequently could have a severe impact on data throughput. For channels being used for voice data, e.g., Voice over IP (VoIP), this will affect both the quality of service (QoS) and, when using call admission control, the number of active mobile devices a channel can support.

Recently, a proposal for "Scheduled Autonomous Probe Response" (SAPR) was made by Motorola, inc. in an IEEE 802.11k Wireless LANs meeting applicable, e.g., for VoIP data. See "IEEE 802.11 04/1010: Proposal and Normative Text for a Scheduled Autonomous Probe Response Generation Function," Date: Sep. 9, 2004, authors Steve Emeott, et al. The idea is to reduce passive scan latency. The SAPR generation function allows an AP to autonomously transmit Probe Response frames at periodic intervals. The SAPR interval is indicated by a SAPR subfield included in a SAPR information element within Beacon and Probe Response frames. The presence of scheduled, autonomous Probe Response frames with the SAPR information element allows stations to rapidly take measurements and find neighbor APs using passive scanning. Thus, the idea is to reduce the amount of time required for passive scanning clients to "find" an AP. Thus, the purpose of SAPR frames is to increase interactivity.

U.S. patent application Ser. No. 11/156,054 to inventors Kinder et al., filed Jun. 17, 2005, and titled USING MINI-BEACONS IN A WIRELESS NETWORK, describes using minimally configured "mini-beacons" between, and more frequently than full beacons. Such beacons have all but the absolutely essential information elements stripped from it. However, there may still be a need to send full beacon information more frequently, e.g., for roaming operations.

Thus there is still a need in the art for an alternate mechanism for sending beacon frames more frequently in a wireless network.

SUMMARY

One aspect of the invention is a wireless device transmitting special beacons ("off-channel beacons") in a separate channel as a mechanism for dealing with some of the disadvantages of alternate methods of providing for rapid roaming, e.g., to increase battery life in battery operated clients. A separate channel is provided for wireless device's transmitting out a rapid, e.g., continuous stream of the off-channel beacons for each AP supported by the WLAN. These off-channel beacons are used to advertise one or more BSSs, and contain an information element (IE) that indicates the channel (s) where an advertised BSS can be found. In one embodiment, the off-channel beacons contain capabilities IEs for the advertised BSS(s), and in one embodiment, also IEs with current loading information for the advertised BSS(s). In this manner, a client receiving the off-channel beacon can make a decision about which channel to select. Note that in one embodiment, DTIM information is not included, as such information is available in the normal beacons. In another embodiment, DTIM information is included.

Thus, presented herein is a method implemented in a first wireless device. The wireless device includes a transmitter and modulator for transmitting, and MAC hardware coupled to the transmitter and modulator. The following is for a particular network identifier of at least one network identifier active in a wireless network having at least one network identifier, each network identifier identifying an infrastructure wireless network. For the particular network identifier of the at least one network identifiers supported, the method includes transmitting frames called "off-channel beacon frames" from the first wireless device. The off-channel beacon frames are configured to advertise the infrastructure wireless network of the particular network identifier by including information to advertise the infrastructure wireless network. The transmitting of off-channel beacons is in a provided channel different than the channel in which the access point of the infrastructure wireless network of the particular network identifier transmits beacon frames. The transmitting of off-channel beacons further is at a rate higher than the beacon rate frame at which the access point of the infrastructure wireless of the particular network identifier transmits beacon frames. The transmitting and the off-channel frames are such that a second wireless device, e.g., a client station, receiving the off-channel beacon can use the information in the off-channel beacon to switch to any of the channels of any network identifiers advertised in the off-channel beacon and/or to choose whether or not to associate or re-associate with the channel of any network identifiers advertised in the off-channel beacon. The client is configured to interpret (and thus understand) the information in the off-channel beacon that advertises the one or more infrastructure wireless networks.

BRIEF DESCRIPTION OF THE DRAWINGS

FIG. 5 shows the structure of the frame body of one embodiment of an off-channel beacon.

FIG. 6 shows the fields of one embodiment of an additional information element called the Channel Redirection Information Element (IE), such additional information element being contained in the frame body described in FIG. 5 of an off-channel beacon embodiment.

FIG. 7 shows an alternate embodiment of the frame body of an off-channel beacon frame embodiment that is not of the same type as a normal full beacon.

FIG. 8 shows the fields of the frame body of a mini-beacon frame according to one aspect of the invention. The mini-beacons are used to indicate the channel for off-channel beacons.

FIG. 9 shows the contents of an additional information element for the embodiment of a mini-beacon described in FIG. 8.

DETAILED DESCRIPTION

Described herein is a method in a wireless station an apparatus, e.g., a wireless station, and a carrier medium carrying computer-readable code segments to instruct at least one processor to execute the method. The method includes transmitting special beacons in a dedicated channel from a wireless device to direct clients to where full beacons are being sent by an access point of a wireless local area network (WLAN). By having a dedicated channel for such beacons, such special beacons may be sent more frequently than ordinary full beacons. The special beacons are called "off-channel" beacons herein.

The invention is useful for networks that include a device that supports multiple BSSIDs, i.e., that can act as a plurality of APs. However, the invention is also useful in any wireless device that includes a transmitter and modulator for transmitting, and MAC hardware coupled to the transmitter and modulator, such a wireless device capable to transmitting frames that conform to MAC frames of a wireless network.

The Network Architecture

Figure 1:
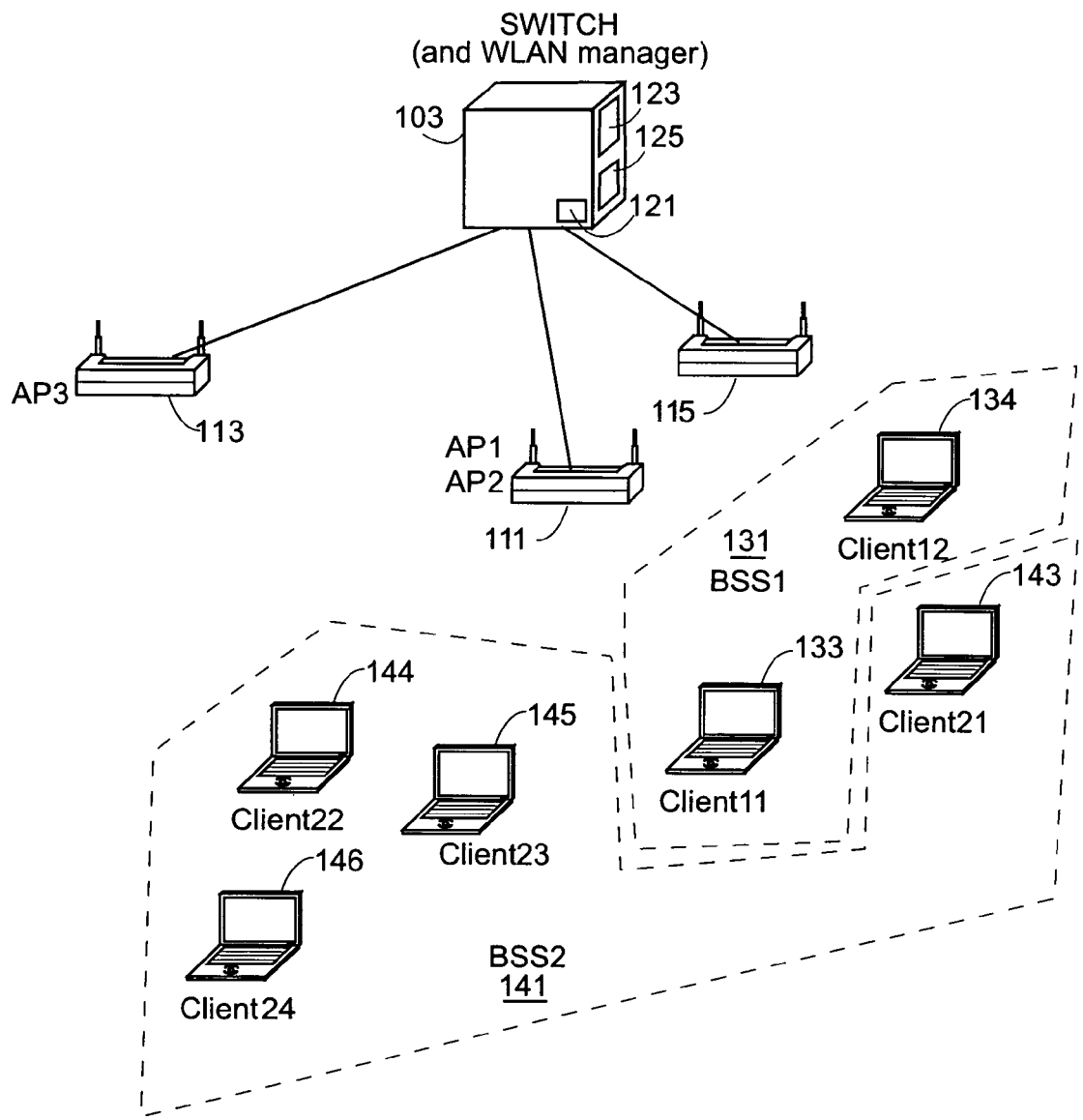
FIG. 1 shows part of an exemplary wireless network 100 that includes a wireless device that includes an embodiment of the present invention in that the device transmits mini-beacon frames in between full beacon frames for a particular BSSID.

FIG. 1 shows part of an exemplary network 100 in which the present invention operates. A set of wireless devices acting as APs—two AP devices, 111 and 113—are shown coupled to a network device 103. The network device 103, in one exemplary embodiment, may include a switch. Device 111 has two basic service sets, respectively denoted BSS1 (131) and BSS2 (141) that have a BSSID denoted BSSID1 and BSSID2, respectfully. Wireless device 111 thus acts as two APs, denoted AP1, and AP2;

Also shown is another wireless device 115 that can act as an AP. In the embodiment described herein, wireless device 115 is a wireless station that operated according to an aspect of the present invention by transmitting special "off-channel" beacons in a dedicated channel.

The network device 103 may also perform other functions, e.g., network device 103 may act as a switch 103 and may also act as a WLAN manager managing such aspects as security and the setting of radio parameters. For the remainder of the description, the device 103 is assumed to be a switch. The coupling of the wireless devices 111, 113 and 115 to the switch 103 may be direct, or via a network. In one embodiment, the coupling is via a fast network such as a Gigabit Ethernet.

BSS1, shown with reference numeral 131, is managed by AP1 of wireless device 111 with BSSID1, and includes client stations 133 and 134, respectively denoted Client11 and Client12. BSS2, shown with reference numeral 141, is managed by AP2 of wireless device 111 with BSSID2, and includes client stations 143, 144, 145, and 146, respectively denoted Client21, Client22, Client23, and Client24. While the drawing shows that the device 111 supports two BSSIDs, in general, a multiple-BSSID wireless device supports a larger number of BSSIDs.

The switch includes a switch processor 123 coupled to a switch memory 125. Part of the switch memory 125 includes code that causes the processor, in combination with hardware and/or software in wireless device 115, to implement the mini-beacon transmitting aspects of the present invention.

Figure 2:
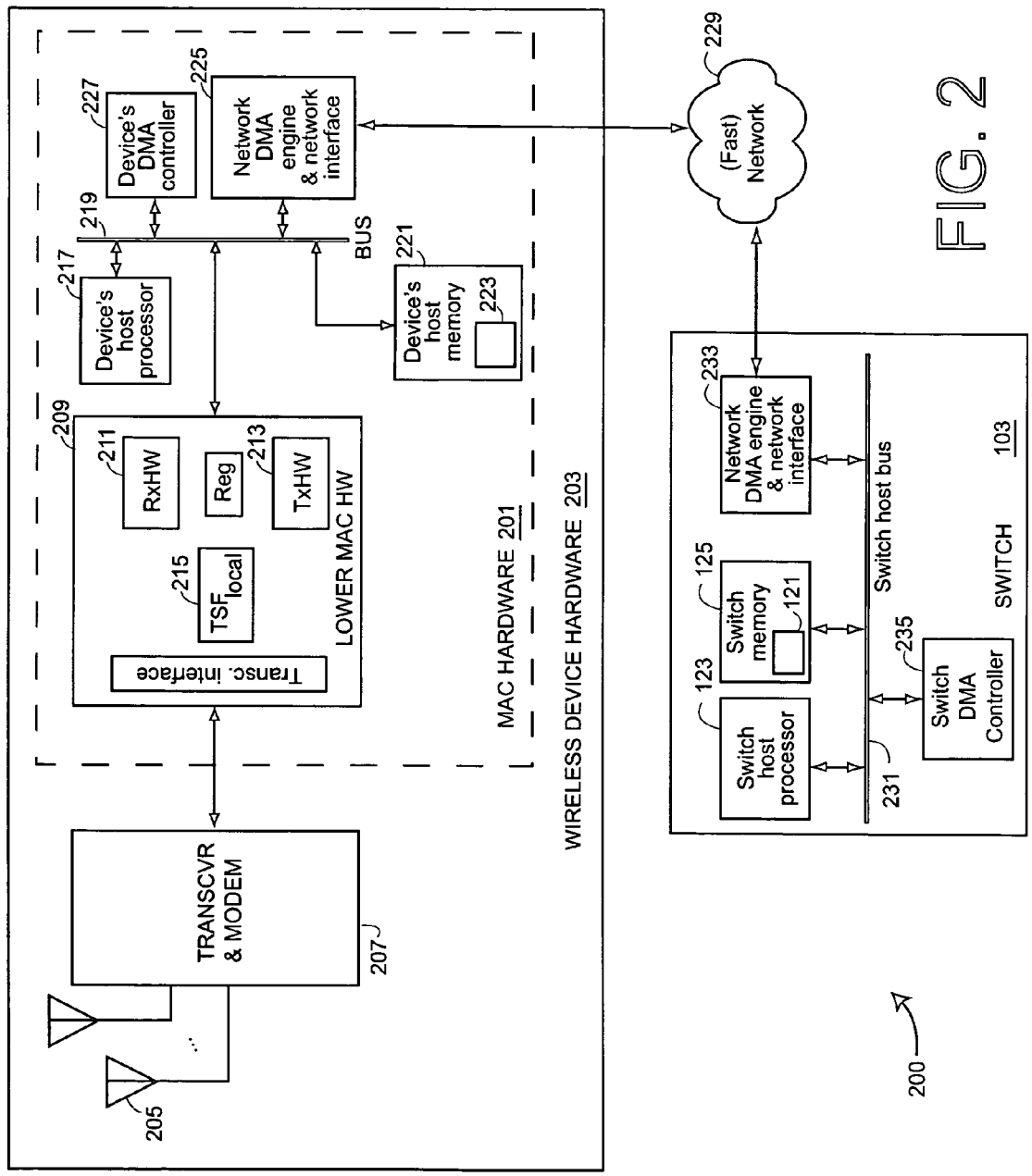
FIG. 2 shows a simplified block diagram of one embodiment of the hardware of a wireless device that includes aspects of the present invention.

FIG. 2 shows a simplified block diagram of one embodiment 200 of the hardware that operates a wireless device, e.g., wireless device 115, including aspects of the present invention for transmitting off-channel beacons for each BSSID. Note that the present invention may also be incorporated in an AP that has only a single BSSID. The hardware at the wireless device is shown as wireless device hardware 203, and is coupled to the switch 103. In one embodiment, part of the operation of the MAC is carried out at the switch 103, and other, lower function parts are carried out in the wireless device hardware 203. The coupling between the access point hardware 203 and switch 103 is via a fast, e.g., Gigabit Ethernet network 229.

The wireless device hardware 203 in one embodiment includes one or more antennas 205 for transmitting and receiving, coupled to a transceiver and modem 207 that receives MAC frames of information, and that transmits MAC frames. The transceiver and modem 207 is coupled to a MAC processor. In the embodiment shown, the functionality of the MAC processor is split between lower MAC hardware 209, a processing system on the wireless device hardware 203, and the switch 103. The transceiver and modem 207 is coupled to the lower MAC hardware 209 via a transceiver interface in the lower MAC hardware. The lower MAC hardware 209 includes receive MAC hardware 211, transmit MAC hardware 213, a local TSF clock 215 denoted $TSF_{local}$, and a register set for passing data. The wireless device hardware 203 is coupled to a wireless device processing system that includes a wireless device host processor 217 coupled via a bus subsystem 219 to a memory 221—the wireless device host memory. A DMA controller 227 deals with DMA transfers.

Those parts of the MAC processing that are based in the wireless device, including aspects of the present invention, are controlled by code 223 that is loaded into the wireless device's host memory 221.

For purposes of this description, the combination of the lower MAC hardware 209 and the wireless device processing system that include, e.g., the wireless device host processor 217 coupled via the bus subsystem 219 to the memory 221, is called the MAC hardware 201 herein, and is shown within a dashed line box in FIG. 2, recognizing of course that the wireless device processing system is used for other aspects of operating the wireless device, e.g., operating the device as a wireless station, and not having to do specifically with MAC processing.

In addition, aspects of the MAC processing, including aspects of the present invention, are carried out at the switch 103.

In one embodiment, the switch 103 includes a switch processing system that has a switch host processor 123, and switch memory 125 coupled to the host processor 123 via a bus subsystem 231. The switch 103 further includes a DMA controller 235 to set up DMA transfers to and from the switch memory 125. Some aspects of the present invention are in the form of code to instruct the processor 123 to carry out one or more steps of a method embodiment of the invention. Thus, aspects of the invention are in the form of code 121 carried in a carrier medium, e.g., memory 125. Furthermore, aspects of the invention may be in the form of a carrier medium that is split between the wireless device hardware 203 and the switch 103, e.g., as a combination of code 223 and code 121.

In the embodiment shown here, when the wireless device transmits, data is streamed from the switch memory 125 directly to the transmit hardware 213 during transmission via a fast network link as if there was no network present. Such streaming is controlled at the wireless device by a network DMA engine and network interface 225 that uses special frames to set up the streaming from the switch memory 125. At the switch, a switch network DMA engine and network controller 233 understands the special frames and uses the information therein to set up the DMA via the switch DMA controller 235. The DMA transfer itself also uses special frames that are formed at the switch's network DMA engine and network controller 233, and understood at the wireless device's network DMA engine and network controller 225.

Furthermore, during receive, in the embodiment shown herein, data is streamed directly into the switch memory 125 via the network 229 as if there was a direct, non-network connection. Such streaming is carried out also using the wireless devices' network DMA engine and network interface 225, and the switch's DMA engine and network interface 233, again using special frames for both setting up the DMA streaming and for streaming of the data itself.

The streaming aspects are described in co-pending U.S. Pending patent applications Ser. No. 10/724,559 filed Nov. 26, 2003 to Krischer, et al., titled "A METHOD AND APPARATUS TO PROVIDE DATA STREAMING OVER A NETWORK CONNECTION IN A WIRELESS MAC PROCESSOR", and Ser. No. 10/815,283 filed Mar. 31, 2004 to Krischer, et al., titled "METHOD AND APPARATUS TO PROVIDE INLINE ENCRYPTION AND DECRYPTION FOR A WIRELESS STATION VIA DATA STREAMING OVER A FAST NETWORK," both assigned to the assignee of the present invention. The contents of both Applications Nos. 10/724,559 and 10/815,283 are incorporated herein by references for all purposes.

Figure 3:
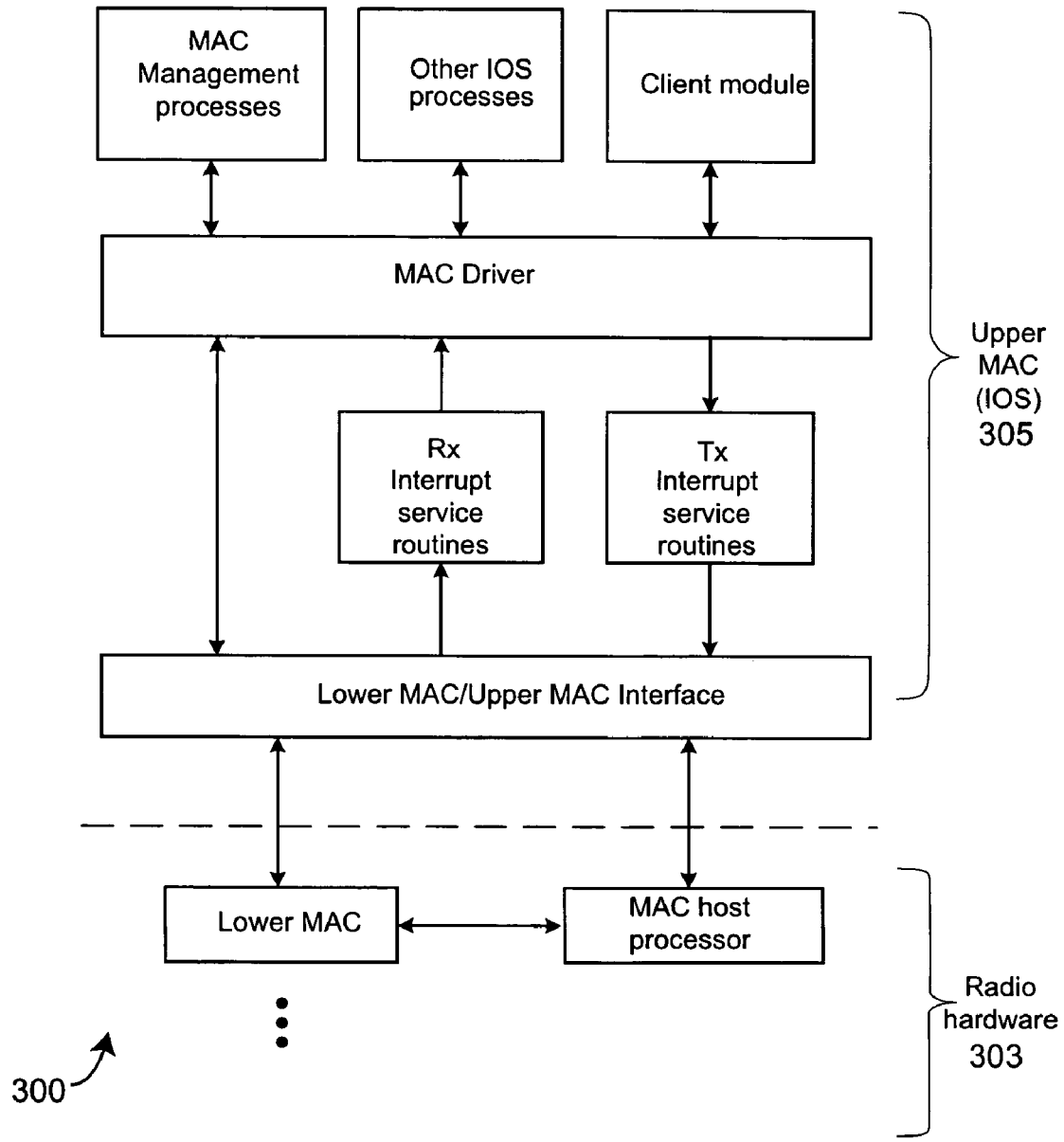
FIG. 3 shows, in simplified block diagram form, one embodiment of a software architecture for the wireless device shown in FIG. 3 that includes an implementation of one or more aspects of the present invention.

FIG. 3 shows one embodiment 300 of a software architecture for the wireless device shown in FIG. 2. The tasks are split between the switch 103, with software 305 operating on the switch host processor 123, e.g., under IOS, the operating systems used in switches made by Cisco Systems, Inc., San Jose, Calif., related to the assignee of the present invention, and software 303 operating in the wireless device hardware 203, in particular, the wireless device hardware's host processor 217 and the lower MAC hardware 209. MAC functions occur as interrupt routines that operate under IOS.

It should be noted that the present invention does not depend on any particular architecture of the wireless device used as the wireless device supporting multiple BSSIDs, or of the MAC processing therein. For example, the network link with the network DMA processors 225 at the wireless device and 233 at the switch can be replaced by non-network connections. Furthermore, in a more traditional architecture, the DMA transfers during transmit and receive can be from and to the wireless device host memory 221. Those in the art will recognize other architectures are possible.

Off-Channel Beacons

One aspect of the invention is providing a dedicated channel for broadcasting special beacons, called off-channel beacons for each BSSID, and using the off-channel beacons to advertise that BSS of the BSSID. The dedicated channel is called the off-channel beacon (broadcast) channel herein, to potential clients. The providing of the separate channel and broadcasting off-channel beacons therein is a mechanism to deal with some of the disadvantages of alternate methods of providing for rapid roaming, e.g., to increase battery life in battery operated clients.

Presented herein is a method implemented in a first wireless device. The wireless device includes a transmitter and modulator for transmitting, and MAC hardware coupled to the transmitter and modulator. The following is for a particular network identifier of at least one network identifier active in a wireless network. The wireless network includes at least one network identifier, each identifying an infrastructure wireless network. Each infrastructure wireless network has an access point transmitting beacon frames at a beacon frame rate. For the particular network identifier of the at least one network identifiers supported, the method includes transmitting frames called "off-channel beacon frames" from the first wireless device. The off-channel frames are configured to advertise the infrastructure network of the particular network identifier. The transmitting of off-channel beacons is in a provided channel different than the channel in which the access point of the infrastructure wireless of the particular network identifier transmits beacon frames. The transmitting of off-channel beacons further is at a rate higher than the beacon rate frame at which the access point of the infrastructure wireless of the particular network identifier transmits beacon frames. The transmitting of the off-channel frames are such that a second wireless device, e.g., a client station, receiving the off-channel beacon can use the information in the off-channel beacon to switch to any of the channels of any network identifiers advertised in the off-channel beacon and/or to choose whether or not to associate or re-associate with the channel of any network identifiers advertised in the off-channel beacon. The client is configured to interpret (and thus understand) the information in the off-channel beacon that advertises the one or more infrastructure wireless networks.

Aspects of the invention are described herein in the context of the IEEE 802.11 standard, although the invention is also applicable to other standards and to wireless networks that do not necessarily comply with a publicly advertised standard. How to modify the terminology and aspects of the invention for non-IEEE 802.11 wireless networks would be clear to one skilled in the art.

The provided channel is called the off-channel-beacon broadcast channel herein. Broadcast therein is a rapid, e.g., continuous stream of the off-channel beacons for the BSSs supported by the WLAN. These off-channel beacons are used to advertise one or more BSSs, and contain an information element (IE) that indicates the data-carrying channel(s) where an advertised BSS can be found. With this information, a client receiving one or more off-channel beacons can switch to the channel or channels of the BSS(s) advertised. In one embodiment, the off-channel beacons contain capabilities IEs for the advertised BSS(s) (as do standard 802.11 beacons), and in one embodiment, also IEs with current loading information. A client receiving the off-channel beacon(s) can use this information to further make a decision about which BSS to associate/re-associate with. In one embodiment, the off-channel beacon includes the DTIM, and in another embodiment, no DTIM information is included.

Thus, one embodiment of the invention is that an off-channel beacon is broadcast on a separate off-channel-beacon broadcast channel. An off-channel beacon includes a special information element (IE) directing off-channel-beacon-aware clients to the right channel for a BSS. For example, the information is in the form of a channel index advertising what channel numbers are available in the frequency band of the BSS. In addition, an off-channel beacon may contain information about a BSS such that clients receiving such off-channel beacons about BSSs can pick a suitable BSS with which to associate.

Figure 4:
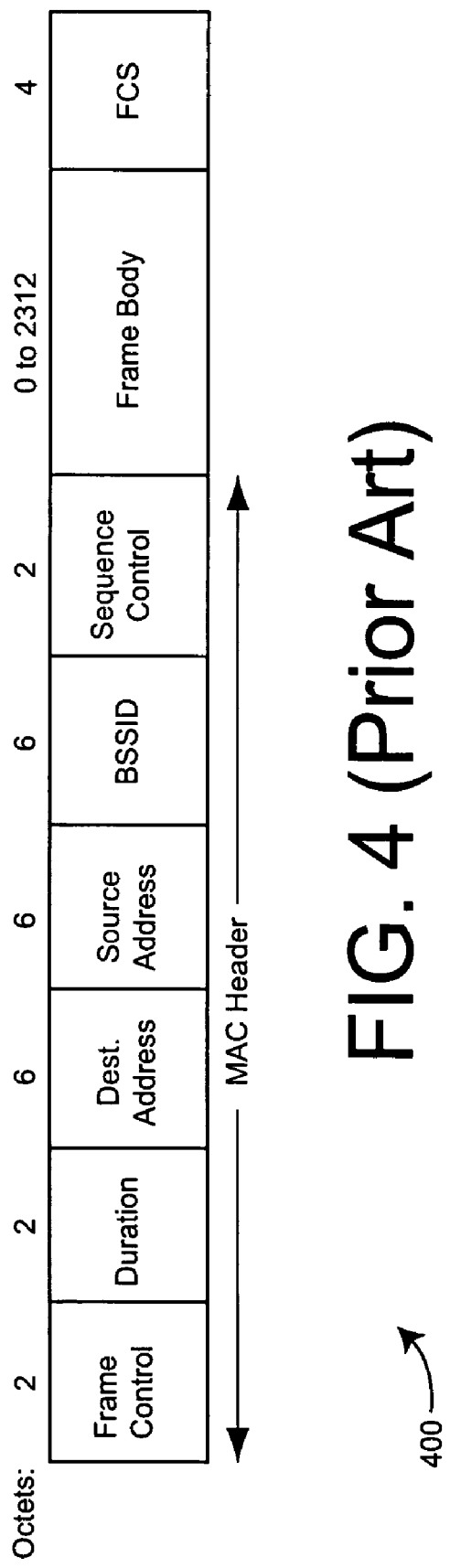
FIG. 4 shows the structure of a MAC frame. Such structure is prior art, but a mini-beacon MAC frame as described herein is not prior art.

In one embodiment, an off-channel beacon frame follows the general structure of a MAC management frame. FIG. 4 shows the general structure of a MAC management frame according to the IEEE 802.11 standard. While the frame structure 400 of FIG. 4 is prior art, a frame having structure 400 with the frame body of an off-channel frame as described herein is not prior art.

FIG. 5 shows one embodiment of the information in a frame body 500 of an off-channel beacon frame. The off-channel beacon frame-body includes a Timestamp field 503 providing time information of the transmitting AP. Note that this timing information is not for the BSS being advertised by this off-channel beacon, but rather for the AP transmitting the off-channel beacon. The off-channel beacon frame-body further includes a Beacon Interval field 505 providing the periodicity of the off-channel beacons of the transmitting AP. Again, note that this is of the AP transmitting the off-channel beacon, not the BSS being advertised. The off-channel beacon frame-body further includes a Capability field 507 for the BSS being advertised, and a SSID field 509 providing the SSID of the BSS being advertised. The off-channel beacon frame-body further includes a Supported Rate field 511 that provides rate(s) supported by the AP transmitting this off-channel beacon, not of the BSS being advertised. The off channel beacons are transmitted at the rate of 1 Mbps only. The off-channel beacon frame-body further includes a Channel Redirection field 513 that provides a list containing channels where the advertised BSS advertised by the off-channel beacon can be found. An Other IEs field 515 is also included that provides information on the BSS being advertised by the off-channel beacon.

In one embodiment, excluded in the off-channel beacons are some information elements that may be included in normal beacons for different variants of the IEEE 802.11 standard, e.g., the IEEE 802.11g standard includes an ERP IE extended rates information element, IEEE 802.11i includes the RSN information element, and so forth.

FIG. 6 shows the fields of one embodiment of the Channel Redirection information element 513. The information element includes an ElementID field that is the vendor element value (224 in this case), and a length element, which provides the length of this IE, 4+1+n where n denotes the number of channels. The information element further includes OUI/Type field with a 3-octet-long vendor OUI and a 1-octet type value chosen by the vendor. The information element further includes a Channel Count field providing the number, denoted n, of channels where the client can find the advertised BSS, and a Channel List field providing a list of n channel numbers of the channels where the client can find the advertised BSS.

Another aspect of the invention is to include client support for an embodiment of the off-channel beacon. Aspects of the invention are intended for operation under a set of specifications that specify some extensions to the IEEE 802.11 specifications that deal with the ability of client stations to understand and react appropriately to proprietary extensions of the IEEE 802.11 standard. One such set of extensions is known as the Cisco Compatible Extensions For WLAN Devices ("CCX"), by Cisco Systems, Inc., of San Jose, Calif. For example, under CCX, a client has to be able to transmit with a transmit power accuracy of ±3 dB. One version of the off-channel beacon is meant to be included as part of CCX. By a "compliant client" is meant a client that conforms to extensions of the IEEE standard in several ways. According to an aspect of the present invention, a compliant client is also off-channel beacon aware, in that the client is able to understand a received off-channel beacon and the fields therein, including any additional proprietary information element.

According to one aspect of the invention, an off-channel-beacon-aware client—that is possibly also otherwise compliant—receives transmitted off-channel beacon frames with fields 500, including the Channel Redirection IE 513 containing the List of channels where the advertised BSS can be found, is able to perform off-channel scans for other APs in the time until the parent beacon is due for its BSS, or is able go to sleep until the parent beacon transmission is due.

Off-channel-beacon-aware clients, that is, clients that are able to recognize these off-channel beacons would then know which channels were available, e.g., for roaming. Because the off-channel beacons are sent at a rapid rate, e.g., continuously, an off-channel-beacon-aware client need not wait long on any one channel before determining that that channel is not the off-channel-beacon broadcast channel. Upon determining that it is not listening on the off-channel-beacon broadcast channel, an off-channel-beacon-aware client can quickly switch to the next. Note that depending on how one interprets the regulatory rules, in the case that off-channel beacons are continually broadcast, an off-channel-beacon-aware client need only switch to another channel if it hears nothing on the air. This provides for reducing the amount of time the client must spend listening on each channel until it finds the off-channel-beacon broadcast channel. Should the off-channel-beacon-aware client hear something, e.g., an IEEE 802.11 frame on the channel, it may, again depending on the interpretation of the regulatory rules, immediately contend for the medium and transmit a probe request, that is, begin active scanning.

Upon receiving one or more off-channel beacons, once the client selects the channel it wants for communication, it can then switch immediately to that channel ("the desired channel for communication").

Currently, most regulations do not recognize the fact that a radar detection "system" may be in place, and requires masters, e.g., each AP to independently test for the presence of radar before it may settle on a channel. Similarly, stations must wait for an "enabling signal" before they may transmit on the channel, effectively preventing active scanning. Under these conditions, a client would wait, worst case, the full beacon period on the selected new channel before sending a probe request or associate request. Again, if the client hears a packet sooner, it can transmit as soon as it gains access to the medium.

In the future however, regulatory authorities may recognize that radar detection systems are available that provide for other entities in the network to communicate the presence or absence of radar to others. Under such conditions, the client may be allowed to transmit a probe request or associate request as soon as it switches to the desired channel for communication.

Another aspect of the invention is dissuading clients that cannot interpret the information in off-channel beacons ("non-off-channel-beacon-aware clients", e.g., so-called "legacy" clients) from associating with the device sending the off-channel beacon upon receiving an off-channel beacon.

In one embodiment, dissuading "legacy" clients not to attempt associating upon receiving an off-channel beacon includes the wireless device that sent the off-channel beacon sending the client a disassociation response to any association request received from the client at the AP.

An alternative approach is to broadcast an off-channel beacon that does not have the structure of a beacon frame, but rather a new frame type other than that of a beacon, such that non-off-channel-beacon aware clients would not be able to recognize the frame type, and would ignore it.

Therefore, in an alternate embodiment, a new management frame is defined, called an off-channel-beacon frame type that is not recognizable as a regular beacon frame type by a legacy client.

Such an alternate embodiment would have the same overall format as the off-channel beacon frame having frame body 500, except that the "Subtype field" of the Frame Control field would read one of the reserved subtype, say 1101. The format of the Frame Control field and its fields is illustrated in FIG. 13 and described in Section 7.1.3.1. titled "Frame Control field" of the 2003 revision of the 1999 IEEE 802.11 standard. See subsection 7.1.3.1.2 titled "Type and Subtype fields" of the Standard. The Type and Subtype fields together identify the function of the frame. There are three frame types: control, data, and management. Each of the frame types have several defined subtypes.

Using the alternate frame structure for the off-channel beacons has the advantage of not having to worry about a legacy client associating as a result of receiving such a frame because such a non-off-channel-beacon-aware client would not be able to understand this frame structure.

The frame body of such an alternate embodiment off-channel frame follows the general frame structure of FIG. 4. That frame body includes an IE, called a BSS Information IE, for each BSS being advertised by the alternate embodiment off-channel frame. Thus, an alternate embodiment off-channel frame typically contains a plurality of BSS Information IEs in its frame body, each Information E providing information for one of the BSSs being advertised by the frame.

FIG. 7 shows the fields 700 of a BSS Information IE for one BSS. The fields 700 include an ElementID field that is the vendor element value (224), a Length field that provides the length of the BSS Information IE, an OUI/Type field that includes a 3-octet vendor OUI and a 1-octet type value chosen by the vendor, an SSID field for the SSID of the BSS being advertised, a Channel Count field for the Number of channels available for the BSS, such a number denoted by n, and a Channel List field that provides a list of channel numbers where a client can find the advertised BSS. Also included are <Other IEs> for the BSS being advertised.

In alternate embodiments, alternate structures are used to convey the BSS to channel map. It should be clear to those in the art that many such alternates are available for transmitting the BSS to channel map information on the separate channel (the off-channel-beacon broadcast channel). Conveying such a map on a separate channel provides for fast channel indexing.

Another aspect of the invention is providing a mechanism to direct clients to the off-channel-beacon broadcast channel. One embodiment uses a pre-selected off-channel beacon channel, that is, a default channel is manually selected to be the off-channel-beacon broadcast channel.

Another embodiment is providing for each compliant client to maintain a cache that includes a list of the channels most recently found to be the "off" channel.

According to another embodiment, the off-channel-beacon channel is indicated to clients as information, e.g., in an IE included in regular beacon frames and probe responses transmitted by access points in the wireless network. That is, according to an aspect of an embodiment of the present invention, full (normal) beacons in the serving channel of the AP include an additional information element to direct clients to the off-channel-beacon broadcast channel containing the off-channel beacons.

Yet another embodiment uses "mini-beacons" that are sent more frequently than full beacons in the serving channel. U.S. patent application Ser. No. 11/156,054 filed Jun. 17, 2005 to inventors Kinder et al., titled USING MINI-BEACONS IN A WIRELESS NETWORK, and assigned to the assignee of the present invention, describes transmitting mini-beacon frames in between consecutive full beacon frames for a BSSID. One aspect is that the mini-beacon frame includes information of a full beacon frame, called a parent frame, but with all but the absolutely essential information elements stripped from it. The contents of U.S. patent application Ser. No. 11/156,054 are incorporated herein by reference.

According to one aspect of the embodiment of the present invention that uses mini-beacons, mini-beacons in the serving channel of the AP, these mini-beacons being a modification of the mini-beacons described in U.S. patent application Ser. No. 11/156,054, include information to direct clients to the off-channel-beacon broadcast channel containing the off-channel beacons.

As described in U.S. patent application Ser. No. 11/156,054, a mini-beacon is transmitted more often than a full beacon on the serving channel. The frame body of a mini-beacon frame includes a subset of the fields of a full beacon, the fields of this subset having the same field definitions as that of a full beacon. FIG. 8 shows the fields 800 of the frame body of a mini-beacon, and in particular shows one embodiment of which fields of a full beacon are included in a mini-beacon. The mini-beacon frame follows the general structure of a beacon frame (See FIG. 4). A mini-beacon embodiment also includes an additional information element (IE) 803, of the type called a "vendor-specific" information element. A mini-beacon for a particular BSSID includes the timestamp from the parent beacon frame for the BSSID such that a client receiving a mini-beacon can maintain time synchronization. The AP transmits frames with timestamps at a first frequency higher than the frequency of sending full parent beacon frames. An aspect of mini-beacons is that the fields of the parent beacon frame that are included in the mini-beacon are selected to discourage a receiving client from attempting to associate with the AP as a result of receiving the mini-beacon. Furthermore, another aspect includes the AP that transmitted a mini-beacon, upon receiving a probe request from a client as a result of the client receiving the mini-beacon, not responding with a probe response to that client.

FIG. 9 shows the contents of the additional information element 803 for one embodiment of a mini-beacon 800. The additional IE 803 includes an element ID field 903 that contains, in one version, the value 224, a length counter 905 that contains the length of the data (5), and the MAC organizationally unique identifier (OUI) value and a new type 907 for this IE. Also included in a mini-beacon is an additional counter that operates in a similar manner to the DTIM counter in a regular full beacon. The counter 805 of FIG. 8 specifies a mini-beacon period. A counter field 909 also is included in the additional IE 803 that specifies the number of mini-beacon periods until the next full beacon is due. For one BSSID, such a full beacon is called a parent beacon of the mini-beacons of the BSSID herein. According to an aspect of an embodiment of the present invention, the additional IE 803 further includes a field 911 that specifies the channel number on which off-channel beacons are broadcast.

Thus, one embodiment is a method implemented in a first wireless device, e.g., an access point. The method that includes, for a particular network identifier, e.g., BSSID, of at least one network identifier active in the first wireless device that supports at least one network identifier, the first wireless device including a transmitter and modulator for transmitting, and MAC hardware coupled to the transmitter and modulator, each network identifier identifying a wireless network, e.g., an IEEE 802.11 BSS for which the first wireless device acts as an access point, transmitting full parent beacon frames periodically at the beacon frame rate for the particular network identifier; and transmitting at least one mini-beacon frame in between consecutive full parent beacon frames for the particular network identifier. Each mini beacon frame includes a subset of the information in a full parent beacon frame, and further including information on the channel in which beacons are being broadcast for the BSS, and an additional element that provides timing information indicative of when the next full parent beacon frame will be transmitted for the particular network identifier. This transmitting is such that a second wireless device for which the first wireless device acts as an access point can determine when the next full parent beacon frame is to be transmitted.

Another aspect of the invention is a wireless device that sends out mini-beacons that indicate the off-channel beacon. One embodiment of such a wireless device is that of an AP that has the architecture of FIG. 2. Another embodiment of such an wireless device has an architecture similar to that shown in FIG. 2, except that the MAC processing for the device is carried out completely in the host processor 221 of the device 203, that is, no streaming of the transmit and receive MAC frames occurs over a fast network.

Yet another aspect of the invention is a wireless station that acts as a client station for an AP that sends out, for each BSSID, a parent beacon and mini-beacons in between each parent beacon. The client is configured to understand such mini-beacon frames, and is called a mini-beacon aware client herein. One embodiment of such an AP has the architecture similar to that of FIG. 2, except that the MAC processing for the client is carried out completely in the host processor 221 of the device 203. That is, no streaming of the transmit and receive MAC frames occurs over a fast network.

Another aspect of the invention is an access point apparatus that sends out off-channel beacons on an off-channel-beacon broadcast channel. One embodiment of such an AP has the architecture of FIG. 2. Another embodiment of such an AP has an architecture similar to that shown in FIG. 2, except that the MAC processing for the APs carried out completely in the host processor 221 of the device 203, that is, no streaming of the transmit and receive MAC frames occurs over a fast network.

In one version, the AP sends the off-channel beacons at a rate higher than the rate that full beacons are sent out on any serving channel.

In another version, the AP sends off-channel beacons continuously, so that the AP is dedicated to sending off-channel beacons. The channel(s) used for communicating data in the BSS (in the case of a single BSS device) or in the at least one BSSs (in the case of a device that can act as a "virtual" AP for a plurality of BSSs) are communicated via a separate AP device.

Figure 10:
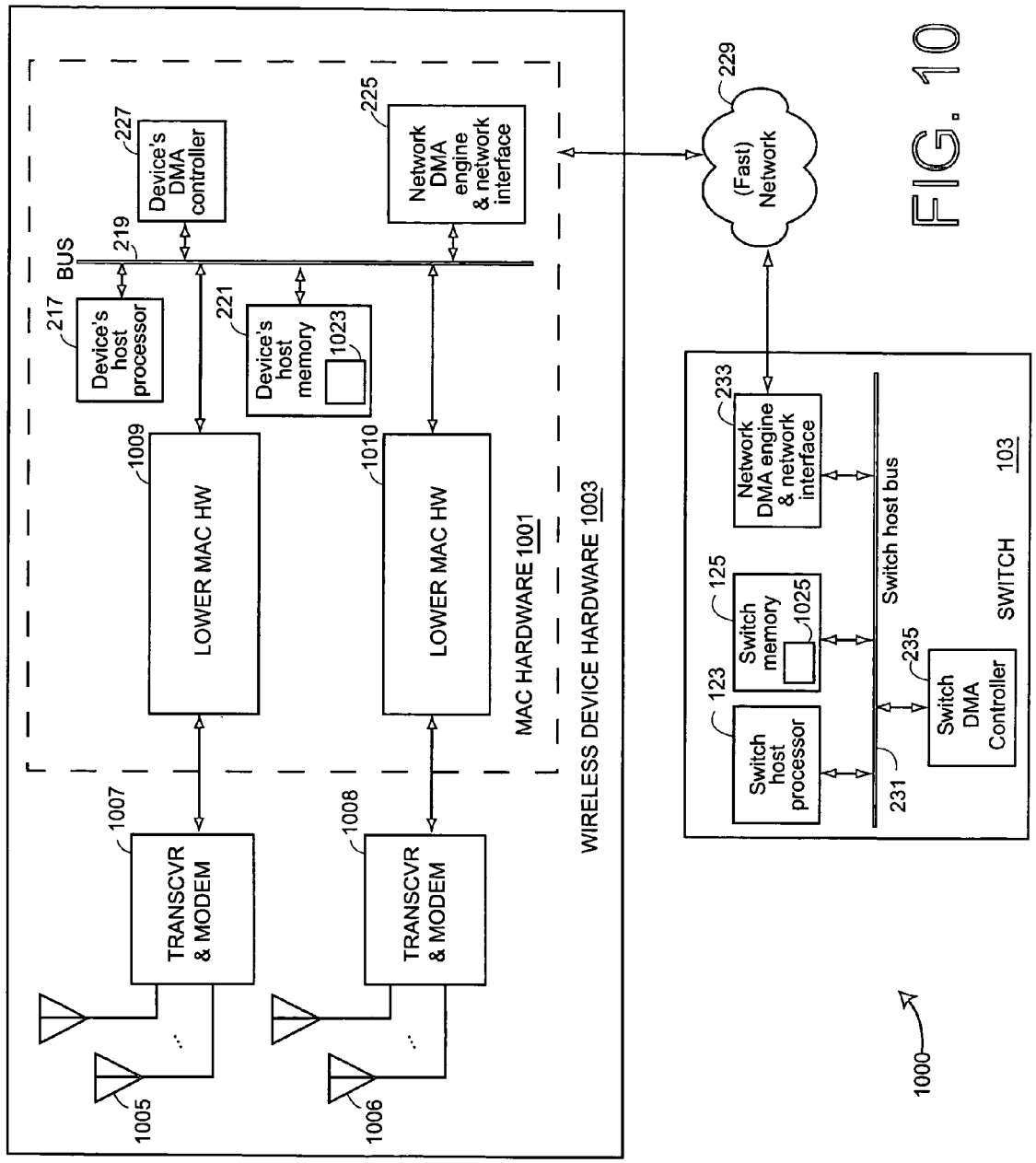
FIG. 10 shows a simplified block diagram of a wireless device that includes two radios such that the device is configured to communicate both the off-channel beacons on the off-channel-beacon channel, and to communicate on other channels.

Another aspect is a dual-radio wireless device configured to both continuously transmit off-channel beacons on the off-channel-beacon broadcast channel via a first radio transmitter, e.g., a first radio transceiver, and also communicate on the channel(s) used for communicating data in the BSS (in the case of a single BSS device) or in the at least one BSSs (in the case of a device that can act as a "virtual" AP for a plurality of BSSs) via a second transceiver. FIG. 10 shows a simplified block diagram of a wireless device 1000 to so communicate both the off-channel beacons on the off-channel-beacon channel, and to communicate on other channels. The hardware at the wireless device is shown as wireless device hardware 1003 that includes a pair of radios, and is coupled to the switch 103. In one embodiment, part of the operation of the MAC is carried out at the switch 103, and other, lower function parts are carried out in the wireless device hardware 1003. The coupling between the access point hardware 1003 and switch 103 is via a fast, e.g., Gigabit Ethernet network 229.

The wireless device hardware 1003 in one embodiment includes two radios including two sets of one or more antennas 1005, 1006 for transmitting and receiving, coupled to a first transceiver and modem 1007 configured to transmit off-channel beacon MAC frames, and a second transceiver and modem 1008 configured to receive MAC frames of information, and to transmit MAC frames. Each of the transceivers and modems 1007, 1008 is coupled to a MAC processor that includes a first lower MAC hardware element 1009, and a second lower MAC hardware element 1010. In the embodiment shown, the functionality of the MAC processor is split between lower MAC hardware elements 1009 and 1010, a processing system on the wireless device hardware 1003, and the switch 103.

Those parts of the MAC processing that are based in the wireless device, including aspects of the present invention, are controlled by code 1023 that is loaded into the wireless device's host memory 221.

For purposes of this description, the combination of the lower MAC hardware 1009, 1010 and the wireless device processing system that includes, e.g., the wireless device host processor 217 coupled via the bus subsystem 219 to the memory 221, is called the MAC hardware 1001 herein, and is shown within a dashed line box in FIG. 10, recognizing of course that the wireless device processing system is used for other aspects of operating the wireless device, e.g., operating the device as a wireless station, and not having to do specifically with MAC processing.

In addition, in one embodiment, aspects of the MAC processing, including aspects of the present invention, are carried out at the switch 103. Some aspects of the present invention are in the form of code to instruct the processor 123 to carry out one or more steps of a method embodiment of the invention. Thus, aspects of the invention are in the form of code 1025 carried in a carrier medium, e.g., memory 125. Furthermore, aspects of the invention may be in the form of a carrier medium that is split between the wireless device hardware 1003 and the switch 103, e.g., as a combination of code 1023 and code 1025.

In the embodiment shown here, when the wireless device transmits, e.g., transmits off-channel beacons, data is streamed from the switch memory 125 directly to the transmit hardware during transmission via a fast network link as if there was no network present. Similarly, during receive or transmit on any channel other than the off-channel-beacon broadcast channel, data is streamed in receive or transmit time, respectively, over the fast network.

Alternate embodiments of hardware can be used that include a first radio dedicated to transmitting off-channel beacons on the off-channel-beacon channel, and a second radio for communicating other data. Such alternate embodiments, for example, need not include the streaming feature described herein.

In a managed radio environment, those in the art will understand that the AP transmitting the off-channel beacons needs to be located and managed so as to provide adequate coverage to potential clients of any BSS being advertised. Furthermore, in particular, for the case of the off-channel beacons being continuously broadcast, careful radio planning may be needed to ensure that any nearby networks that use the off-channel-beacon broadcast channel for regular communication do not suffer intolerable interference from the device transmitting the off-channel beacons.

Note that one aspect of the invention is that a client that does not properly receive the off-channel beacons is still able to receive regular full beacons and mini-beacons in the case mini-beacons are transmitted, so that normal roaming function is still possible.

Another aspect of the present invention, applicable to managed networks, is that a management entity can provide the necessary information to dedicated off-channel beacon generators. Furthermore, a management entity that has a view of the complete radio space, e.g., that also is involved in radio planning, can be configured to dynamically select APs to use for transmitting off-channel beacons without significantly impacting network coverage.

Another aspect of the present invention is a client that can receive and interpret off-channel beacons as described above. Yet another aspect of the present invention is a method implemented in a client station, including receiving off-channel beacons in the off-channel beacon channel, and interpreting the off-channel beacons, such that the client can switch to the channel(s) of the BSS advertised in the off-channel beacon, and further can decide whether or not to associate with the AP of the advertised BSS.

Another aspect of the client method includes the client maintaining a cache of most recent off-channel beacon channels, such that the client can switch to the most recent off-channel beacon channel to attempt to receive off-channel beacons. The client method includes switching to the next most recent off-channel beacon channel to attempt receiving the one or more off-channel beacon frames until the receiving of the one or more off-channel beacon frames is successful.

Another embodiment of the client method is applicable when full beacons include an IE indicating the off-channel beacon. The method includes the client receiving a beacon containing an indication of the off-channel beacon channel, and switching to the off-channel beacon channel prior to the receiving of the one or more off-channel beacon frames.

Note that in the above description, it is assumed that the transmitting is in a frequency band that is divided into a number of channels, e.g., channels identified by a channel number. For example, wireless stations that conform to the IEEE 802.11b standard transmit in the 2.4 GHz band, as do wireless stations that conform to the IEEE 802.11g standard, while wireless stations that conform to the IEEE 802.11a standard transmit in the 5 GHz band. The invention is applicable to any frequency band. The inventors do recognize that the 2.4 GHz band, as used today (2005) in variants of the IEEE 802.11 standard, has few channels, and it is unlikely that one would want to use a complete channel for the off-channel beacons, the number of channels may change in the future even for the 2.4 GHz band. Furthermore, the invention is equally applicable to wireless network that operate at more than one frequency band. For example, devices that operate according to both the 802.11a, and 802.11b standard.

It should be appreciated that although the invention has been described in the context of the IEEE 802.11 standard, the invention is not limited to such contexts and may be utilized in various other applications and systems Furthermore, while a transceiver embodiment for operation conforming to the IEEE 802.11 standards has been described, the invention may be embodied in wireless devices conforming to other standards and for other applications, including, for example other WLAN standards and other wireless standards. Applications that can be accommodated include IEEE 802.11 wireless LANs and links, wireless Ethernet, HIPERLAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

In keeping with common industry terminology, the terms "base station", "access point", and "AP" may be used interchangeably herein to describe an electronic device that may communicate wirelessly and substantially simultaneously with multiple other electronic devices, while the terms "mobile device" and "STA" may be used interchangeably to describe any of those multiple other electronic devices, which may have the capability to be moved and still communicate, though movement is not a requirement. However, the scope of the invention is not limited to devices that are labeled with those terms.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computing platform" may comprise one or more processors.

The methodologies described herein are, in one embodiment, performable by a machine, which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics processing unit, and/or a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries machine-readable code segments (e.g., software) including instructions for performing, when executed by the processing system, one of more of the methods described herein. The software may reside in the hard disk, or may also reside, completely or at least partially, within the RAM and/or within the processor during execution thereof by the computer system. Thus, the memory and the processor also constitute carrier medium carrying machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of a switch or wireless device, e.g., an access point or a client station, as appropriate. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium.

The software may further be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, and volatile media. Non-volatile media includes, for example, optical, magnetic disks, and magneto-optical disks. Volatile media includes dynamic memory, such as main memory. For example, the term "carrier medium" shall accordingly be taken to included, but not be limited to, solid-state memories, optical media, and magnetic media.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

In the description herein, numerous specific details are set forth. However, it is understood that embodiments of the invention may be practiced without these specific details. In other instances, well-known methods, structures and techniques have not been shown in detail in order not to obscure an understanding of this description.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

"Variants of the IEEE 802.11 standard" as used herein means the variants and proposed variants of the IEEE 802.11 standard. Variants are versions defined in clauses of the standard and proposed amendments of the standard.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. hus, including is synonymous with and means comprising.

Similarly, it is to be noticed that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method in a first wireless device, the wireless device including a transmitter and modulator for transmitting, and MAC hardware coupled to the transmitter and modulator, the method comprising:

for a particular network identifier of at least one network identifier active in a wireless network that supports at least one network identifier, each network identifier identifying an infrastructure wireless network, each infrastructure wireless network having an access point transmitting beacon frames at a beacon frame rate, transmitting frames ("off-channel beacons") from the first wireless device, the off-channel beacon frames configured to advertise the infrastructure wireless network of the particular network identifier by including advertising information advertising the infrastructure wireless network, the transmitting of off-channel beacons being in a provided dedicated channel for broadcasting off-channel beacons ("the off-channel-beacon channel") different than the channel in which the access point of the infrastructure wireless of the particular network identifier transmits beacon frames, the transmitting of off-channel beacons further being at a rate higher than the beacon rate frame at which the access point of the infrastructure wireless of the particular network identifier transmits beacon frames, the advertising information in the off-channel frames including information that indicates the channel or channels where the beacon frames of the advertised infrastructure networks or networks are being transmitted, such that a second wireless device receiving the off-channel beacon can use the information in the off-channel beacon to switch to any of the channels of the infrastructure wireless network or networks advertised in the off-channel beacon and/or to choose whether or not to associate or re-associate with the channel of any infrastructure network advertised in the off-channel beacon, the second wireless device being configured to interpret the information in the off-channel beacon that advertises the one or more infrastructure wireless networks, the method further comprising:
dissuading a third wireless device from associating with the first wireless device, wherein the third wireless device is a non off-channel beacon aware client and further wherein dissuading includes the first wireless device sending the third wireless device a disassociation response to any association request received from the third wireless device.

2. A method as recited in claim 1, wherein the off-channel beacon further includes information on the capabilities of the advertised BSS(s).

3. A method as recited in claim 2, wherein the off-channel beacon further includes current loading information for the advertised BSS(s).

4. A method as recited in claim 1, wherein the transmitting of the off-channel beacons in the off-channel-beacon channel is continuous.

5. A method as recited in claim 1, wherein the wireless networks are basic service sets (BSSs) substantially compatible with the IEEE 802.11 standard, and wherein the network identifiers are BSSIDs.

6. A method as recited in claim 1, wherein
the third wireless device is configured such that it cannot interpret the advertising information in the off-channel beacon.

7. A method as recited in claim 1, wherein the dissuading includes the first wireless device sending the third wireless station a disassociation response to any association request received from the client.

8. A method as recited in claim 1, wherein the off-channel beacon is of a management frame type different from a regular beacon frame type, such that a third wireless device that cannot interpret the advertising information in the off-channel beacon and that receives the off-channel beacon from the first wireless device will not attempt to associate with the first wireless device as a result of receiving the off-channel beacon.

9. A method as recited in claim 1, wherein the off-channel-beacon channel is pre-selected.

10. A method as recited in claim 1, wherein the off-channel-beacon channel is indicated to clients as information included in regular beacon frames and probe responses transmitted by access points in the wireless network.

11. A method as recited in claim 1, wherein the off-channel-beacon channel is indicated to clients as information included in mini-beacon frames transmitted by access points in the wireless network more frequently than and in between full beacons, and that are smaller than the full beacons, and wherein frame and wherein frame body of the mini-beacon frame includes a subset of the fields of the full beacon frames and the fields of the full beacon frame that are included in the mini-beacon are selected to discourage a receiving wireless device from attempting to associate with the AP as a result of receiving the mini-beacon.

12. A method in a first wireless station of a wireless network, the method comprising:
for a particular network identifier of at least one network identifier active in a wireless network that supports at least one network identifier, each network identifier identifying an infrastructure wireless network, each infrastructure wireless network having an access point transmitting beacon frames at a beacon frame rate,
receiving one or more frames ("off-channel beacons") from a second wireless device, the off-channel beacon frames configured to advertise the infrastructure wireless network of the particular network identifier by including advertising information advertising the infrastructure wireless network, the receiving of off-channel beacons being in a provided dedicated channel for broadcasting for broadcasting off-channel beacons ("the off-channel-beacon channel") different than the channel in which the access point of the infrastructure wireless of the particular network identifier transmits beacon frames, the off-channel beacons being transmitted by the second wireless device at a rate higher than the beacon frame rate at which the access point of the infrastructure wireless of the particular network identifier transmits beacon frames, the advertising information in the off-channel frames including information that indicates the channel or channels where the beacon frames of the advertised infrastructure networks or networks are being transmitted; and
interpreting the information in the received off-channel beacons, such that the first wireless device receiving the off-channel beacon advertising the infrastructure wireless network of the particular network identifier can use the information in the off-channel beacon to switch to any of the channels of the infrastructure wireless network or networks advertised in the off-channel beacon and/or to choose whether or not to associate or re-associate to be on the channel of any infrastructure network advertised in the off-channel beacon, and further such that a non off-channel beacon aware client device is dissuaded from associating with the first wireless device, the non off-channel beacon aware client device being configured such that it cannot interpret the advertising information in the off-channel beacon and further wherein dissuading includes the second wireless device sending the non off-channel beacon aware client device a disassociation response to any association request received from the non-off-channel beacon aware client device.

13. A method as recited in claim 12, wherein the off-channel beacon channel is pre-selected.

14. A method as recited in claim 12, further comprising:
maintaining a cache of most recent off-channel beacon channels; and
switching to the next most recent off-channel beacon channel to attempt receiving the one or more off-channel beacon frames until the receiving of the one or more off-channel beacon frames is successful.

15. A method as recited in claim 12, wherein the off-channel-beacon channel is indicated to the first wireless station as information included in regular beacon frames and probe responses transmitted by access points in the wireless network, the method further comprising:

receiving a beacon containing an indication of the off-channel beacon channel, and switching to the off-channel beacon channel prior to the receiving of the one or more off-channel beacon frames.

16. A method as recited in claim 12, wherein the off-channel-beacon channel is indicated to clients as information included in mini-beacon frames transmitted by access points in the wireless network more frequently than and in between full beacons, and that are smaller than the full beacons and wherein frame body of the mini-beacon frame includes a subset of the fields of the full beacon frames and the fields of the full beacon frame that are included in the mini-beacon are selected to discourage a receiving wireless device from attempting to associate with the AP as a result of receiving the mini-beacon, the method further comprising:

receiving a mini-beacon containing an indication of the off-channel beacon channel, and switching to the off-channel beacon channel prior to the receiving of the one or more off-channel beacon frames.

17. A method in a first wireless device operating as an access point of a wireless network, the method comprising:

transmitting frames that include information indicative of a dedicated channel for broadcasting off-channel beacons (the "off-channel beacon channel") distinct from data channels, the off-channel beacon channel being the channel where, for a particular network identifier of at least one network identifier active in the wireless network that supports at least one network identifier, each network identifier identifying an infrastructure wireless network, one or more frames ("off-channel beacons") from a second wireless device, the off-channel beacon frames configured to advertise the infrastructure wireless network of the particular network identifier by including advertising information advertising the infrastructure wireless network, the off-channel beacons being transmitted by the second wireless device at a rate higher than rate at which full beacons are transmitted by the first access point, the advertising information in the off-channel frames including information that indicates the channel or channels where the beacon frames of the advertised infrastructure networks or networks are being transmitted; and such that a third wireless device receiving frames that include information indicative of the off-channel beacon channel and that can interpret off-channel beacons, can switch to the indicated off-channel beacon channel, and receive one or more off-channel beacons that provide for the third wireless device the ability to use the information in the off-channel beacon to switch to any of the channels of the infrastructure wireless network or networks advertised in the off-channel beacon and/or to choose whether or not to associate or re-associate to be on the channel of any infrastructure network advertised in the off-channel beacon, the method further comprising:

dissuading a non off-channel beacon aware client device from associating with the first wireless device, the non off-channel beacon aware client device being configured such that it cannot interpret the advertising information in the off-channel beacon and further wherein dissuading includes the first wireless device sending the third wireless device a disassociation response to any association request received from the third wireless device.

18. A method as recited in claim 17, wherein the transmitted frames that include information indicative of the off-channel beacon channel are full beacon frames.

19. A method as recited in claim 17, wherein the transmitted frames that include information indicative of the off-channel beacon channel are mini-beacon frames transmitted more frequently than and in between full beacon frames, and that are smaller than the full beacon frames and wherein frame body of the mini-beacon frame includes a subset of the fields of the full beacon frames and the fields of the full beacon frame that are included in the mini-beacon are selected to discourage a receiving wireless device from attempting to associate with the AP as a result of receiving the mini-beacon.

20. A tangible computer-readable carrier medium, having encoded thereon at least one computer readable code segment that when executed by one or more processors of a processing system in a first wireless device, cause the first wireless device to carry out a method, the first wireless device including a transmitter and modulator for transmitting, and MAC hardware coupled to the transmitter and modulator, the method comprising:

for a particular network identifier of at least one network identifier active in a wireless network that supports at least one network identifier, each network identifier identifying an infrastructure wireless network, each infrastructure wireless network having an access point transmitting beacon frames at a beacon frame rate, transmitting frames ("off-channel beacons") from the first wireless device, the off-channel beacon frames configured to advertise the infrastructure wireless network of the particular network identifier by including advertising information advertising the infrastructure wireless network, the transmitting of off-channel beacons being in a provided dedicated channel for broadcasting off-channel beacons ("the off-channel-beacon channel") different than the channel in which the access point of the infrastructure wireless of the particular network identifier transmits beacon frames, the transmitting of off-channel beacons further being at a rate higher than the beacon frame rate at which the access point of the infrastructure wireless of the particular network identifier transmits beacon frames, the advertising information in the off-channel frames including information that indicates the channel or channels where the beacon frames of the advertised infrastructure networks or networks are being transmitted, such that a second wireless device receiving the off-channel beacon can use the information in the off-channel beacon to switch to any of the channels of the infrastructure wireless network or networks advertised in the off-channel beacon and/or to choose whether or not to associate or re-associate to be on the channel of any infrastructure network advertised in the off-channel beacon, the second wireless device being configured to interpret the information in the off-channel beacon that advertises the one or more infrastructure wireless networks, the method further comprising:

dissuading a third wireless device from associating with the first wireless device, wherein the third wireless device is a non off-channel beacon aware client and further wherein dissuading includes the first wireless device sending the third wireless device a disassociation response to any association request received from the third wireless device.

21. An apparatus in a wireless device including a transmitter and modulator, the apparatus comprising:

for a particular network identifier of at least one network identifier active in a wireless network that supports at least one network identifier, each network identifier identifying an infrastructure wireless network, each infrastructure wireless network having an access point transmitting beacon frames at a beacon frame rate, means for transmitting frames ("off-channel beacons") from the first wireless device via the transmitter and modulator, the off-channel beacon frames configured to advertise the infrastructure wireless network of the particular network identifier by including advertising information advertising the infrastructure wireless network, the transmitting of off-channel beacons being in a provided dedicated channel for broadcasting off-channel beacons ("the off-channel-beacon channel") different than the channel in which the access point of the infrastructure wireless of the particular network identifier transmits beacon frames, the transmitting of off-channel beacons further being at a rate higher than the beacon frame rate at which the access point of the infrastructure wireless of the particular network identifier transmits beacon frames, the advertising information in the off-channel frames including information that indicates the channel or channels where the beacon frames of the advertised infrastructure networks or networks are being transmitted, such that a second wireless device receiving the off-channel beacon can use the information in the off-channel beacon to switch to any of the channels of the infrastructure wireless network or networks advertised in the off-channel beacon and/or to choose whether or not to associate or re-associate to be on the channel of any infrastructure network advertised in the off-channel beacon, the second wireless device being configured to interpret the information in the off-channel beacon that advertises the one or more infrastructure wireless networks, the apparatus further comprising:

means for dissuading a third wireless device from associating with the first wireless device, wherein the third wireless device is a non off-channel beacon aware client and further wherein dissuading includes the first wireless device sending the third wireless device a disassociation response to any association request received from the third wireless device.

22. An apparatus in a wireless device including a transmitter and modulator, the apparatus including a processing element configured to carry out a method that includes:

for a particular network identifier of at least one network identifier active in a wireless network that supports at least one network identifier, each network identifier identifying an infrastructure wireless network, each infrastructure wireless network having an access point transmitting beacon frames at a beacon frame rate, transmitting frames ("off-channel beacons") from the first wireless device via the transmitter and modulator, the off-channel beacon frames configured to advertise the infrastructure wireless network of the particular network identifier by including advertising information advertising the infrastructure wireless network, the transmitting of off-channel beacons being in a provided dedicated channel for broadcasting off cannel beacons ("the off-channel-beacon channel") different than the channel in which the access point of the infrastructure wireless of the particular network identifier transmits beacon frames, the transmitting of off-channel beacons further being at a rate higher than the beacon frame rate at which the access point of the infrastructure wireless network of the particular network identifier transmits beacon frames, the advertising information in the off-channel frames including information that indicates the channel or channels where the beacon frames of the advertised infrastructure networks or networks are being transmitted, such that a second wireless device receiving the off-channel beacon can use the information in the off-channel beacon to switch to any of the channels of the infrastructure wireless network or networks advertised in the off-channel beacon and/or to choose whether or not to associate or re-associate to be on the channel of any infrastructure network advertised in the off-channel beacon, the second wireless device being configured to interpret the information in the off-channel beacon that advertises the one or more infrastructure wireless networks, the method further comprising:

dissuading a third wireless device from associating with the first wireless device, wherein the third wireless device is a non off-channel beacon aware client and further wherein dissuading includes the first wireless device sending the third wireless device a disassociation response to any association request received from the third wireless device.

* * * * *

UNITED STATES PATENT AND TRADEMARK OFFICE
CERTIFICATE OF CORRECTION

PATENT NO.        : 7,457,620 B2
APPLICATION NO. : 11/182206
DATED             : November 25, 2008
INVENTOR(S)       : Lam et al.

It is certified that error appears in the above-identified patent and that said Letters Patent is hereby corrected as shown below:

In column 1, line 37, kindly replace "Infull" with --In full--

In column 18, line 21, kindly replace "hus" with --Thus--

In column 19, line 12, claim 1 kindly replace "with" with --to be on--

In column 22, line 17, claim 20 kindly replace "transmifter" with --transmitter--

Signed and Sealed this

Thirty-first Day of March, 2009

JOHN DOLL
*Acting Director of the United States Patent and Trademark Office*